March 12, 1946.  L. SPRARAGEN  2,396,295
FILTER SCREEN
Filed Oct. 5, 1943  2 Sheets-Sheet 1
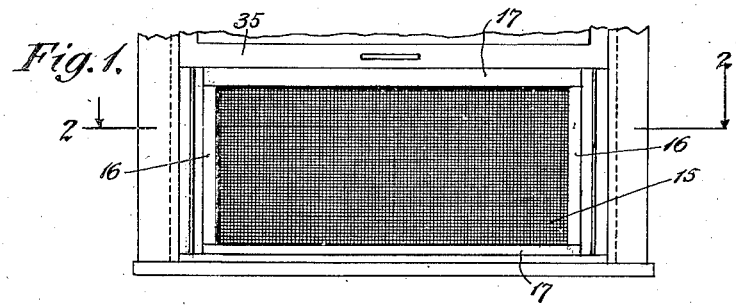
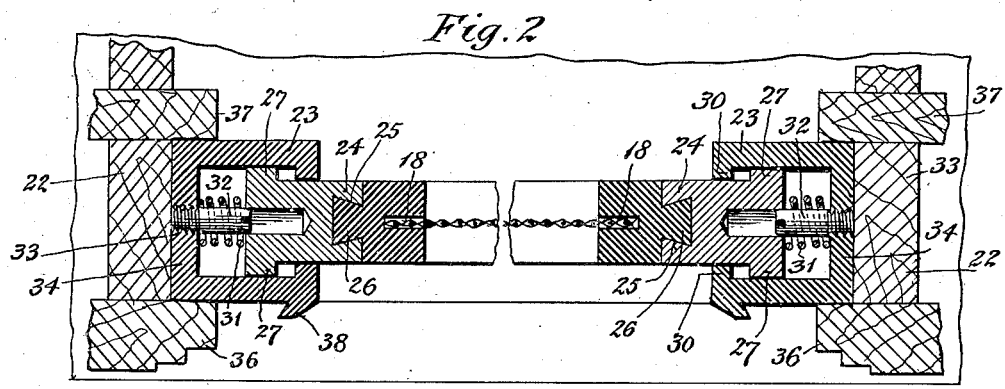
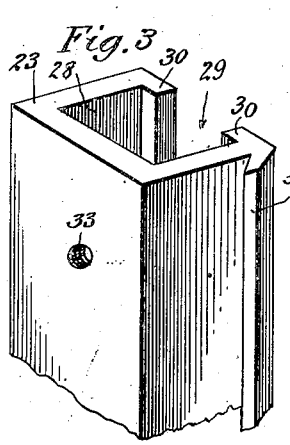
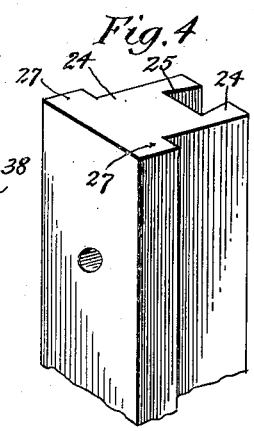
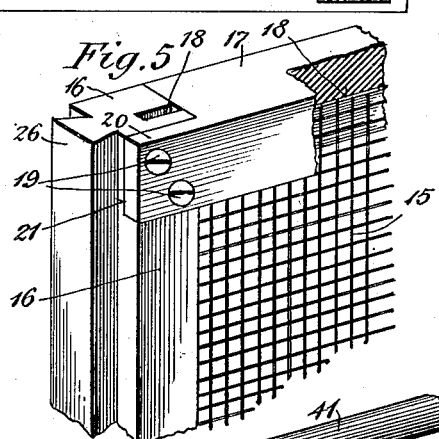
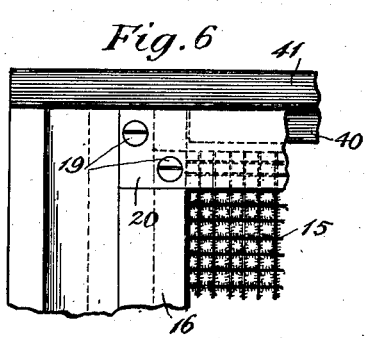
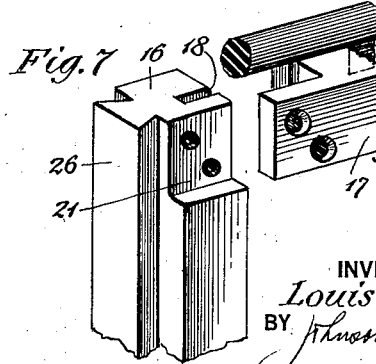
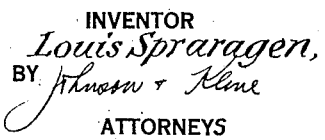
INVENTOR
Louis Spraragen,
BY
ATTORNEYS March 12, 1946.    L. SPRARAGEN    2,396,295
FILTER SCREEN
Filed Oct. 5, 1943    2 Sheets-Sheet 2
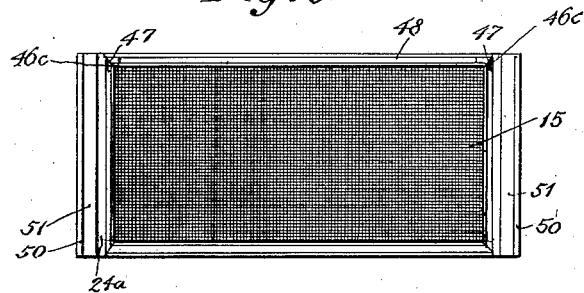
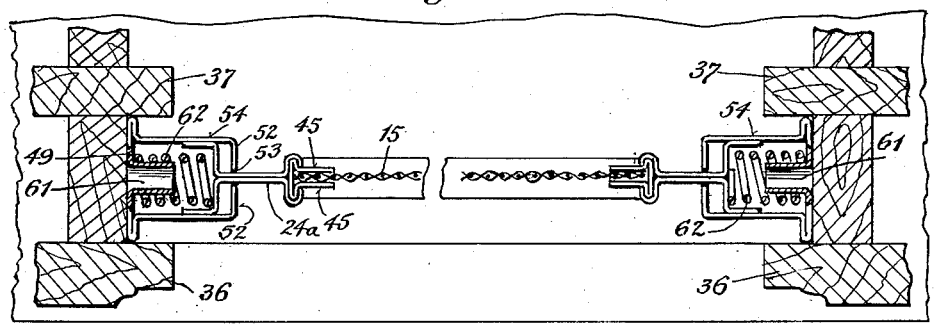
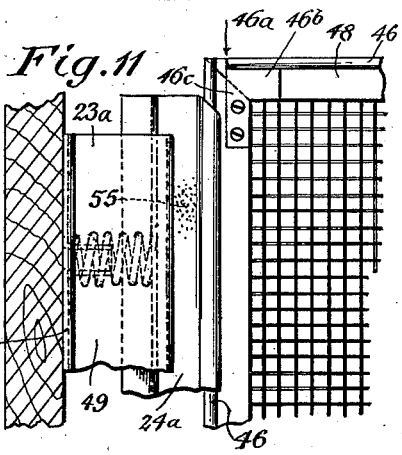
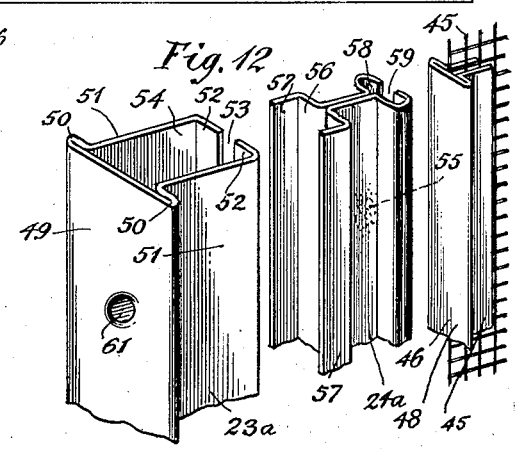
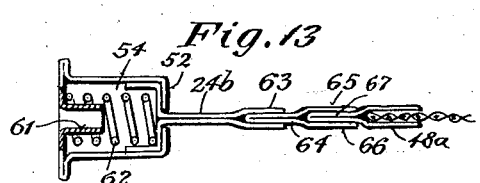
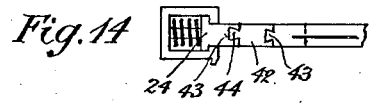
INVENTOR
Louis Spraragen.
BY Johnson + Kline
ATTORNEYS Patented Mar. 12, 1946

2,396,295

UNITED STATES PATENT OFFICE 2,396,295

FILTER SCREEN

Louis Spraragen, Bridgeport, Conn., assignor to Bridgeport Fabrics, Inc., Bridgeport, Conn., a corporation of Connecticut Application October 5, 1943, Serial No. 505,009

20 Claims. (Cl. 160—40)

This invention relates to air filters, and particularly to the provision of a filter adapted to be removably fitted in the opening of a window or the like so as to permit the passage of air, yet arrest or stop the passage of insects, dust, and other foreign particles with which the air may be ladened.

The filter of the present invention, while equally well adapted for industrial uses, is illustrated herein in the forms at present preferred for use in windows of dwellings.

One of the more important features of this invention is the provision of a filter-screen which may be prepared and marketed in knockdown form. For this purpose, the device is made up of a number of individual sections (which may be made of moldable composition generally known as plastics) or of formed sheet metal properly shaped, cut to size, and interfitting with one another to form a surrounding frame for a sheet of open mesh material, and lateral extension means therefor adapted to fit in the space in a window frame in which the sash slides.

Of course, the present invention is not limited, in all its aspects, to such a knockdown construction, for if desirable the device may be factory-assembled as shipped ready for use.

Another feature of this invention is the provision of the lateral extension means and the surrounding frame for the sheet of screening in such a way that the extension means may be easily and quickly removed from the frame so that the screening may be cleaned mechanically or cleansed chemically without involving the extension means, or if desired or needed an old screen may be removed and a new one replaced with ease and facility.

A still further feature is the provision of the lateral extension means in the form of an expansible and contractible unit, so as to facilitate the insertion of the edges of the device in the space between the sash stops, and preferably the unit is yieldingly expanded so that the device is held in place firmly in all window casings of substantially the same width regardless of variations in the distances between opposite sides of the casing.

According to this invention, the expansible lateral extension for the screen frame may be used on either or both sides of the frame as desired. For symmetry, it is preferable to use it on both sides.

Another feature is the provision of supplementary lateral extensions which may be interposed between the frame and the main lateral extensions so as to increase the effective width of the device at will and adapt it to windows of larger widths and still use the same filter screen and its frame.

A further feature is the provision of a filter-screen having a soft pliable edge to be engaged and compressed by and therefore tightly fit against the lower edge of the window when it is lowered after the device is placed in position.

Still another feature of the present invention is the provision of the surrounding frame for the sheet of screening in such a way that the screening may be easily and quickly removed and cleansed mechanically without involving the surrounding frame, or if desired or needed, old screening may be removed and a new or different type screening replaced with ease and facility.

Other features and advantages will hereinafter appear.

In the accompanying drawings—

Figure 1 is a front elevation showing the device of the present invention in place in a window.

Fig. 2 is a horizontal section of the device and related window parts taken on the line 2—2 of Fig. 1.

Fig. 3 is a perspective view of the upper portion of the sash-engaging member of the device of the present invention.

Fig. 4 is a similar view of the member which cooperates with the member shown in Fig. 3 to make up the lateral extension.

Fig. 5 is a perspective view of the upper corner of the screen frame.

Fig. 6 is an elevation of the upper corner of the screen frame with the lateral extension thereon showing attached thereto a weather strip adapted to be engaged by the lower edge of the sash.

Fig. 7 is a perspective view of the side member of the screen frame.

Fig. 8 is a perspective view showing the top member of the screen frame.

Fig. 9 is a front elevation of the screen made in accordance with the present invention, but in this case the frame and lateral extensions are made of sheet metal.

Fig. 10 is a view similar to Fig. 2, showing the sheet metal screen of the present invention.

Fig. 11 is a schematic view showing the corner of the sheet metal screen frame and the lateral extensions, and showing the manner in which the elements may be slid into the desired position relative to each other.

Fig. 12 is an exploded view showing the screen frame and the lateral extension parts separated from each other.

Fig. 13 shows one side of the screen of the present invention with an extra extension between the screen frame and the lateral extensions, the parts being made of sheet metal.

Fig. 14 is a similar view, but the parts being made of molded material.

As shown in the accompanying drawings, in Figs. 1 to 8, in which the parts of the device may be made of molded or plastic material, the device comprises essentially a sheet or wire or other suitable mesh 15. The screen may be made of wire covered with a layer of flocking material so that the interstices of the mesh are more or less closed by the projecting fibres of the flock according to the use to which the screen is to be put. If the filter screen is to trap very fine dust and other impalpable material carried by the air entering the room or building, the fibres will be so arranged as to extend far into the interstices. If a greater quantity of air is desired and only larger matter to be filtered out, the fibres of the screen need not extend as far into the interstices or as voluminously.

The frame for the screening 15 according to the present invention is made up of units which can be furnished in knockdown form and assembled by the user. The frame has side members 16 and top and bottom members 17. These members have internal grooves 18 to receive the edges of the wire. When cut to desired length, the sides 16 and top and bottom 17 may be secured together at the corners of the rectangular frame formed by them by drive or other suitable screws 19. In assembling the screen, three sides of the screen frame may be secured together. Then the screening 15 is inserted within the internal grooves 18, and the fourth member of the frame is secured in place. The top and bottom members 17 preferably have extending tongues 20 which fit into notches 21 in the side portions, and the overlap thus formed may receive the fastening screws. If it is desired to clean the screening or substitute a plain or unflocked screening for one which is flocked, or a screening of different mesh, this may be done by simply removing the screws 19 from either the top or the bottom members 17.

The frame for the screen is, according to the present invention, somewhat narrower than the opening of the window, and yieldable lateral extension means are provided to fill the space between the side members 16 of the frame and the casing members 22 of the window.

In the broader aspects of this invention, one side of the screen frame may lie against the casing member 22 while the other side has a lateral extension. However, for symmetry and greater utility, the present invention provides the lateral extensions on both sides of the screen frame.

Usually, the lateral extension comprises two members, a casing-engaging member 23 and a screen-engaging member 24. As shown in Figs. 1 to 8, the screen-engaging member 24 is provided with a dovetail groove 25, while the side member 16 of the screen frame is provided with a dovetail tenon 26 which may be slid into the dovetail groove 25 longitudinally to hold the member 24 to the screen frame. The lateral extension member 24 is substantially T-shape in cross section producing ribs 27 extending beyond the body portion. The companion member 23 has a vertical channel 28 and an open longitudinal slot 29 defined by vertical ribs 30. The device is assembled by sliding the member 24 longitudinally into the member 23, the ribs 27 engaging the internal wall of the cavity 28 while the sides of the body of the member 24 engage the surfaces of the flanges 30.

In addition, the member 24 is slidable laterally in the member 23 and is pressed outwardly of the latter until the ribs 27 engage the flanges 30, before the device is inserted in a window sash, by springs 31 which may be guided on pins 32 threaded in a hole 33 in the outer portion 34 of the member 23.

The screen being thus assembled outside the window opening, and assuming that there are lateral extension means at both sides of the screen, after the window sash 35 has been raised to the desired height, the screening is grasped by the members 23 and placed in the window casing. In order to permit the screen to pass the front stops 36 on the window casing, the hands carrying the screen are moved together thus pulling the members 23 toward each other against the springs 31 and reducing the overall width of the screen by an amount to permit its movement past the stops into engagement with the portion of the casing in which the window sash slides. The grip is then released on the members 23 and the springs 31 force them outwardly into yielding but firm engagement with the casing. The members 23 are preferably in such shape as to fit snugly between the stops 36 and the divider bars 37 of the window casing. The members 23 may have projecting flanges 38 to act as finger grips and facilitate drawing of the members together when the screen is placed in the window. The window sash is then lowered until it engages the upper edges of the members 16, 17, 23 and 24.

In order to make a tight and resilient fit between the lower edge of the sash and the screen of the present invention, the top bar 17 may be provided with a slot 39 as shown in Fig. 3, to receive the attaching strip 40 of weather stripping material 41. The attaching strip 40 may be cut off the weather stripping, and thus permit the latter to extend over the side members 16 of the screen frame and the members 23 and 24 of the lateral extension as shown in Fig. 6.

Since considerable relative movement is permitted between the members 23 and 24 against the resistance of the spring 31, the lateral extensions will firmly hold the screen in position in the casing in spite of differences in width between the opposite casing members caused by variations in the manufacture thereof.

If a screen designed for a smaller window is to be used with a larger size, it may be made to fit the latter by the use of one or more interponents 42 shown in Fig. 14. Such an interponent constructed for use with the screen frame and lateral extensions shown in Figs. 1 to 8 has a dovetail slot 43 at one edge to engage the dovetail 26 on the screen frame, and a dovetail 44 on the other edge to engage the dovetail slot 25 in the member 24.

With the screen constructed as illustrated in Figs. 1 to 8, it may be desirable to assemble it complete at the factory, but this, of course, will require packing or crating the devices in such a way as to protect the screening from damage. It is not necessary to do this, however, since the construction illustrated permits the screen to be shipped knocked-down. The top and bottom 17, sides 16 and members 23 and 24 being bunched together and the screening 15 being rolled, these parts may be placed in a tubular container and will form a small self-sustaining package.

To assemble the screen, it will merely be necessary for the purchaser to assemble the frame made up of the top and bottom pieces 17 and the side pieces 16 and fasten them together, after placing the screening in the grooves 18, by means of the screws 19. The frame thus made may then be slid in the dovetail 25 and the member 24 slid into the member 23.

The pieces 16, 17, 23 and 24 may be made of wood or they may be made of molded or extruded plastic material, the latter being preferable since the parts, when so made, require an expenditure of very little additional labor to prepare them for use.

As shown in Figs. 9 to 12, a screen like the screen shown in Figs. 1 to 8 may be made of metal sections. In this metal construction, the screening 15 is held between flanges 45 of a sheet metal frame having a flat edge portion 46. The frame may be made of a continuous strip of metal, the flange portions 45 of which are notched out to permit the metal strip to be bent to form the corners of the frame with the flanges 45 abutting at 47.

The frame 48 thus formed is provided with extension members 23a and 24a on one or both sides, and these are relatively movable so that the member 23a may be slid over the member 24a sufficiently to permit the former to pass the front stop 36 (see Fig. 10) of the window casing and enter the channel between the latter and the parting strip 37 and hold the screen snugly in position.

The construction of the members 23a and 24a is best illustrated in Fig. 12. The member 23a has an outer portion 49 and edges 50, each bent back upon itself, for strength and rigidity and projecting sides 51 having flanges 52 extending toward each other and forming between them a slot 53 leading to the channel 54 formed between the side members 51. The bar 24a is made of two pieces welded together at various points, for instance as indicated at 55. The outer ends of these parts have flanges 56 and 57 forming a T head to be slidably received by the channel 54, the flanges 57 riding on the inside surface of the sides 51, as shown in Fig. 10. At the inner side, the member 24a has the parts curled over to form a channel 58 having a longitudinal opening 59. The channel 58 slidably receives the edge portion 46 of the screening frame 48. In assembling the units, the member 24a is slid into the member 23a and then the screen framing 48 is slid into the channel 58.

In order to permit the screen frame 48 to be assembled with its side-supporting members 24a, the construction illustrated in Fig. 11 may be advantageously employed. Here it will be seen that both ends of the frame bead 46 are to be cut back, as at 46a, so as to permit the upper stringer of the frame to be inserted into the lower ends of the side channels 58 and slid upwards therein. In order to reinforce the frame corners where the horizontal beads have been cut back, each frame corner may be provided with an angle bracket 46b having its horizontal leg secured or preferably welded to the stringer 48, while its vertical leg 46c clears the channeled strip 58 and may be firmly affixed to the vertical frame side 48c by screws 48d. As the transverse members are removable, the screening may be removed or replaced by removing one side of the framing and slide the one screening out and the other in as described in Figs. 1-8. The outer portion 49 of the member 23a is pierced and drawn so as to provide one or more posts 61 to receive an anchor for one end of springs 62 inserted between the outer member and the flanges 56 of the member 24a. These springs yieldably urge the member 23a outwardly relative to the member 24a and serve to resiliently hold the device in the window casing.

If it is desired that the screen be adaptable to windows of various widths, the arrangement shown in Fig. 13 may be employed, in which the inner end of the member 24b has an open slot 63 to receive a tongue 64 on an extension member 65 which has an open slot 66 to receive a tongue 67 on the screen frame 48a.

Variations and modifications may be made within the scope of this invention and portions of the improvements may be used without others.

I claim:

1. In a window screen including a sheet of screen material; a frame surrounding and supporting the same having joined side and top members, at least one side member on its outer longitudinal edge having a tongue portion; and a lateral extension for said tongue-carrying side member comprising an inner bar having a slot to longitudinally slidably receive said tongue portion, said bar also having projecting flange portions, and an outer bar having a slot and cavity to longitudinally slidably receive and interlock with the inner bar and flange portions thereon respectively, for inward and outward movement relative to the inner bar, said outer bar having an outer edge of a width to fit between the sash stops of a window casing, and resilient means between said two bars for pressing the outer bar outwardly against the window casing to resiliently hold the window screen in position, and yielding to enable the outer bar to be moved toward the inner bar to facilitate installation and removal of the window screen from a window casing.

2. In a window screen including a sheet of filter screen material; a frame surrounding and supporting the same having joined side and top members, at least one side member on its outer longitudinal edge having a tongue portion; and a lateral extension for said tongue-carrying side member comprising an inner bar having a slot to longitudinally slidably receive said tongue portion, said bar also having projecting flange portions, and an outer bar having a slot and cavity to longitudinally slidably receive and interlock with the inner bar and flange portions thereon respectively, for inward and outward movement relative to the inner bar, said outer bar having an outer edge of a width to fit between the sash stops of a window casing, and resilient means between said two bars for pressing the outer bar outwardly against the window casing to resiliently hold the filter-screen in position, and yielding to enable the outer bar to be moved toward the inner bar to facilitate installation and removal of the filter-screen from a window casing, said outer bar having a finger grip to facilitate such movement thereof.

3. In a window screen including a sheet of screen material; a frame surrounding and supporting the same having joined side and top members, at least one side member on its outer longitudinal edge having a dovetail tongue portion; and a lateral extension for said tongue-carrying side member comprising an inner bar having a dovetail slot to longitudinally slidably receive said tongue portion, said bar also having projecting flanges forming an enlarged outer edge portion, and an outer bar having a slot and cavity to longitudinally slidably receive and interlock with the inner bar and enlarged edge portion thereon respectively for inward and outward movement relative to the inner bar, said outer bar having an outer edge of a width to fit between the sash stops of a window casing, and resilient means between said two bars for pressing the outer bar outwardly against the window casing to yieldingly hold the window screen in position, and to enable the outer bar to be moved toward the inner bar to facilitate the installation and removal of the window screen from a window casing.

4. In a window screen including a sheet of screen material; a frame surrounding and supporting the same having joined molded side and top members, at least one side member on its outer longitudinal edge having a tongue portion; and a lateral extension for said tongue-carrying side member comprising a molded inner bar having a slot to longitudinally slidably receive said tongue portion, said bar also having an enlarged outer edge portion, and a molded outer bar having a slot and cavity to longitudinally slidably receive and interlock with the inner bar and enlarged edge portion thereon respectively, for inward and outward movement relative to the inner bar, said outer bar having an outer edge of a width to fit between the sash stops of a window casing, and resilient means between said two bars for pressing the outer bar outwardly against the window casing to yieldingly hold the window screen in position, and to enable the outer bar to be moved toward the inner bar to facilitate insertion and removal of the window screen from a window casing.

5. In a window screen including a sheet of screen material; a frame surrounding and supporting the same having joined side and top members, at least one side member on its outer longitudinal edge having a dovetail tongue portion; and a lateral extension for said tongue-carrying side member comprising a molded inner bar having a dovetail slot to longitudinally slidably receive said tongue portion, said bar also having an enlarged outer edge portion, and a molded outer bar having a slot and cavity to longitudinally slidably receive and interlock with the inner bar and enlarged edge portion thereon respectively, for inward and outward movement relative to the inner bar, said outer bar having an outer edge of a width to fit between the sash stops of a window casing, and resilient means between said two bars for pressing the outer bar outwardly against the window casing to yieldingly hold the window screen in position, and to enable the outer bar to be moved toward the inner bar to facilitate the insertion and removal of the window screen from a window casing.

6. In a window screen including a sheet of screen material; a frame surrounding and supporting the same having joined side and top members, at least one side member on its outer longitudinal edge having a tongue portion; and a lateral extension for said tongue-carrying side member comprising an inner bar having a slot to longitudinally slidably receive said tongue portion, said bar also having projecting an enlarged outer edge portion, and an outer bar having a slot and cavity to longitudinally slidably receive and interlock with the inner bar and enlarged edge portion thereon respectively, for inward and outward movement relative to the inner bar, said outer bar having an outer edge of a width to fit between the sash stops of a window casing, and springs between said two bars for pressing the outer bar outwardly against the window casing to resiliently hold the window screen in position, and yielding to enable the outer bar to be moved toward the inner bar to facilitate the installation and removal of the window screen from a window casing.

7. In a window screen including a sheet of screen material; a frame surrounding and supporting the same having joined molded side and top members, at least one side member having on its outer longitudinal edge a dovetail tongue portion; and a lateral extension for said tongue-carrying side member comprising a molded inner bar having a dovetail slot to longitudinally slidably receive said tongue portion, said bar also having projecting flanges forming an enlarged outer edge portion, and a molded outer bar having a slot and cavity to longitudinally slidably receive and interlock with the inner bar and enlarged head flange portions thereon respectively for inward and outward movement relative to the inner bar, said outer bar having an outer edge of a width to fit between the sash stops of a window casing, and spring resilient means between said two bars for pressing the outer bar outwardly against the window casing to resiliently hold the window screen in position, and yielding to enable the outer bar to be moved toward the inner bar to facilitate installation and removal of the window screen from a window casing, said outer bar having a finger grip to facilitate the same movement thereof.

8. In a filter-screen for closing an opening including a sheet of flocked screen material; a frame surrounding and supporting the same having joined side and top members, the side members having a tongue portion; and a lateral extension for said frame comprising an inner bar having a slot to slidingly receive said tongue portion of the frame, said bar also having projecting flange portions, and an outer bar having a slot and cavity to slidingly receive and interlock with the first-named bar and flange portions thereon respectively, said outer bar having a surface to engage the sides of a casing about the opening, and said flange portion being laterally movable in said cavity, and resilient means between said two bars for pressing the outer bar outwardly against the casing to resiliently hold the filter-screen in position, said outer bar having a finger grip by means of which it may be moved toward the inner bar to facilitate installation and removal of the filter-screen from the casing.

9. In a window screen including a sheet of screen material; a frame surrounding and supporting the same having joined molded side and top members, at least one of said side members having a tongue portion; and a lateral extension for said tongue-carrying side member comprising a molded inner bar having a slot to longitudinally slidably receive said tongue portion, said bar also having projecting flange portions, and a molded outer bar having a slot and cavity to longitudinally slidably receive and interlock with the inner bar and flange portions thereon respectively for inward and outward movement relative to the inner bar, said outer bar having a width to fit between the sash stops of a window casing, and resilient means between said two bars for pressing the outer bar outwardly against the window casing to resiliently hold the window screen in position, and yielding to enable the outer bar to be moved toward the inner bar to facilitate the installation and removal of the window screen from a window casing.

10. In a window screen including a sheet of screen material; a frame surrounding and supporting the same having joined sheet metal side and top members, the side members being substantially T-shaped in cross-section producing extending ribs; and a lateral extension comprising a sheet metal inner bar, the inner vertical side of the inner bar being formed into a longitudinal channel having inturned edges to slidingly receive and interlock with the extending ribs of the side members, the opposite outer vertical side of the inner bar having projecting flange portions, and a sheet metal outer bar having a slot and a longitudinally extending enlarged cavity in back of said slot to slidingly receive and interlock with the outer vertical portion of the inner bar and flanges thereon respectively, said outer bar having a width to fit between the sash stops of the window casing and said flange portions being laterally movable in said cavity; and resilient means between said two bars for pressing the outer bar outwardly against the window casing, to resiliently hold the window screen in position.

11. In a filter-screen for closing an opening including a sheet of filter-screen material; a frame surrounding and supporting the same having joined sheet metal sides and top members, at least one of said side members being substantially T-shaped in cross section producing extending ribs; and a lateral extension for said T-shaped side members comprising a sheet metal inner bar comprised of two sheet metal pieces joined together at various points, the inner vertical side of the inner bar having the pieces formed into a vertical longitudinal channel having inturned edges to longitudinally slidably receive and interlock with the side members and the extending ribs thereon respectively, the opposite outer vertical side of the inner bar having projecting flange portions; a sheet metal outer bar having a slot and a longitudinally extending enlarged cavity in back of said slot to longitudinally slidably receive and interlock with the outer vertical portions of the inner bar and flange portions thereon respectively; and resilient means between said two bars for pressing the outer bar outwardly against a casing about the opening to resiliently hold the filter-screen in position and yielding to allow the outer bar to be moved toward the inner bar to facilitate insertion and removal of the filter-screen from the casing.

12. In a window screen including a sheet of screen material; a frame surrounding and supporting the same having joined sheet metal side and top members, at least one of said metal side members having on its outer longitudinal edge extending ribs; and a lateral extension for said side members comprising a sheet metal inner bar comprised of two sheet metal pieces joined together at various points, the inner vertical side of the inner bar having the pieces formed into a vertical longitudinal slot to longitudinally slidably receive the extending ribs of the side members; the opposite outer vertical side of the inner bar having projecting flanges forming an enlarged outer head portion; and a sheet metal outer bar having a slot and a longitudinally extending enlarged cavity in back of said slot to longitudinally slidably receive and interlock with the inner bar and enlarged head flange portions thereon respectively for inward and outward movement relative to the outer bar, said outer bar having outer edges each bent back upon itself for strength and rigidity and being of a width to fit between the sash stops of a window casing and springs between said two bars for pressing the outer bar outwardly against the window casing to resiliently hold the window screen in position and yielding to allow the outer bar to be moved toward the inner bar to facilitate insertion and removal of the window screen from a window casing.

13. In a filter-screen including a sheet of flocked screen material; a peripherally beaded frame surrounding and supporting the same having joined vertical and horizontal members; and a lateral extension comprising a bar, the inner vertical side of which is formed into a longitudinal channel with inturned edges to slidingly receive and interlock with the frame bead of the vertical members, the frame bead of the horizontal members being cut back from that of the vertical members to provide vertical passages through which the inturned edges may pass into engagement with the bead on the vertical members as said bead is inserted into the longitudinal channel of the extension bar.

14. In a filter-screen including a sheet of flocked screen material; a peripherally beaded frame surrounding and supporting the same having joined sheet metal vertical and horizontal members; and a lateral extension comprising a sheet metal bar, the inner vertical side of which is formed into a longitudinal channel having turned edges to slidingly receive and interlock with the frame bead of the vertical members, the frame bead of each sheet metal horizontal member being cut back from each adjoining frame bead of the sheet metal vertical members to provide vertical passages through which the bead on the vertical members may be inserted in the longitudinal channel of the extension bar.

15. In a screen including a sheet of screen material; a peripherally beaded frame surrounding and supporting the same having joined sheet metal vertical and horizontal members; and lateral extensions for the respective vertical frame beads comprising a sheet metal bar comprised of two pieces joined together at various points, the inner vertical side of the bar having the pieces forming a vertical channel with inturned edges to longitudinally slidably receive and interlock with the frame bead of the vertical members, the frame bead of at least one of the horizontal members being cut back from the frame beads of the adjoining vertical members to provide vertical passages through which the bead on the vertical members may be inserted in the longitudinal channel of the extension bar.

16. In a window screen including a sheet of screen material; a peripherally beaded frame surrounding and supporting the same having joined sheet metal vertical and horizontal members, a frame bead of at least one of said horizontal members being cut back from the frame bead of at least one of its adjoining vertical members, the cut-back horizontal member being secured to its adjoining vertical member by a bracket means, and a lateral extension comprising a sheet metal inner bar comprised of two sheet metal pieces joined together at various points, the inner vertical side of the inner bar having inturned edges on the pieces thereof forming a vertical longitudinal slot to longitudinally slidably receive and interlock with the frame bead of the said vertical member, the opposite outer vertical side of the inner bar having projecting flange portions and a sheet metal outer bar having a slot and a longitudinally extending enlarged cavity in back of said slot to slidingly receive and interlock with the outer vertical portion of the inner bar and flanges thereon respectively, said outer bar having a width to fit between the sash stops of the window casing and said flange portions being laterally movable in said cavity; and resilient means between said two bars for pressing the outer bar outwardly against the window casing to resiliently hold the window screen in position.

17. In a screen including a sheet of screen material; a rectangular frame surrounding and supporting the same having joined side and top members, the top member having a slot in its upper surface to receive an attaching strip of yielding weather stripping material with the upper surface forming a backing for supporting the weather stripping when pressure is applied in the direction of the surface.

18. In a filter-screen comprising a sheet of flocked screen material having fibers extending into the apertures in the screen to collect foreign material and prevent passage thereof through the screen; a rectangular frame comprising vertical and horizontal members having internal grooves therein, the screen material being mounted in said frame with the wire edges inserted in the internal grooves of the frame, at least one member of said frame being separately secured to its adjoining members for ready removal therefrom to provide for the insertion and withdrawal of the screen material from the internal grooves of the members of the frame whereby the flocked screen may be readily removed from the frame for cleaning or replacement.

19. In a filter screen comprising a sheet of flocked screen material having fibers extending into the apertures in the screen to collect foreign material and prevent passage thereof through the screen; a rectangular frame comprising vertical and horizontal members having internal grooves therein, the screen material being mounted in said frame with the wire edges inserted in the internal grooves of the frame; and means for yieldingly mounting the frame in an opening, said means including a readily detachable connection for the frame to provide for the insertion and withdrawal of the frame and screen material from the mounting means to facilitate removal of the flocked screen for cleaning and replacement.

20. In a filter screen comprising a rectangular frame; mounting means therefor for positioning the frame in an opening including means for readily detachably connecting the frame thereto; and a sheet of flocked screen material having fibers extending into the apertures in the screen to collect foreign material and prevent passage thereof through the screen mounted in the rectangular frame, said frame comprising vertical and horizontal members having internal grooves therein with the edges of the screen material inserted in the internal grooves of the frame, at least one member of said frame being separably secured to its adjoining members for ready removal therefrom to provide for the insertion and withdrawal of the screen material in the internal grooves of the members of the frame when the frame is detached from the mounting means therefor, to facilitate the removal of the flocked screen material for cleaning and replacement.

LOUIS SPRARAGEN.